INVENTOR.
KLAUS BRANDENBURG

INVENTOR.
KLAUS BRANDENBURG

# United States Patent Office 3,541,337
Patented Nov. 17, 1970

3,541,337
PHOTOELECTRIC WIDTH MEASURES USING PULSE PRODUCING SCANNING MEMBERS
Klaus Brandenburg, Hamburg, Germany, assignor, by mesne assignments, to U.S. Philips Corporation, New York, N.Y., a corporation of Delaware
Filed Oct. 21, 1966, Ser. No. 588,402
Claims priority, application Germany, Oct. 31, 1965,
P 38,007
Int. Cl. G01b 11/02
U.S. Cl. 250—219
4 Claims

ABSTRACT OF THE DISCLOSURE

A device for measuring width of a moving object having a dual set of pulse producing scanners with means for selecting pulse sets to accurately give width indications.

Figure 1:
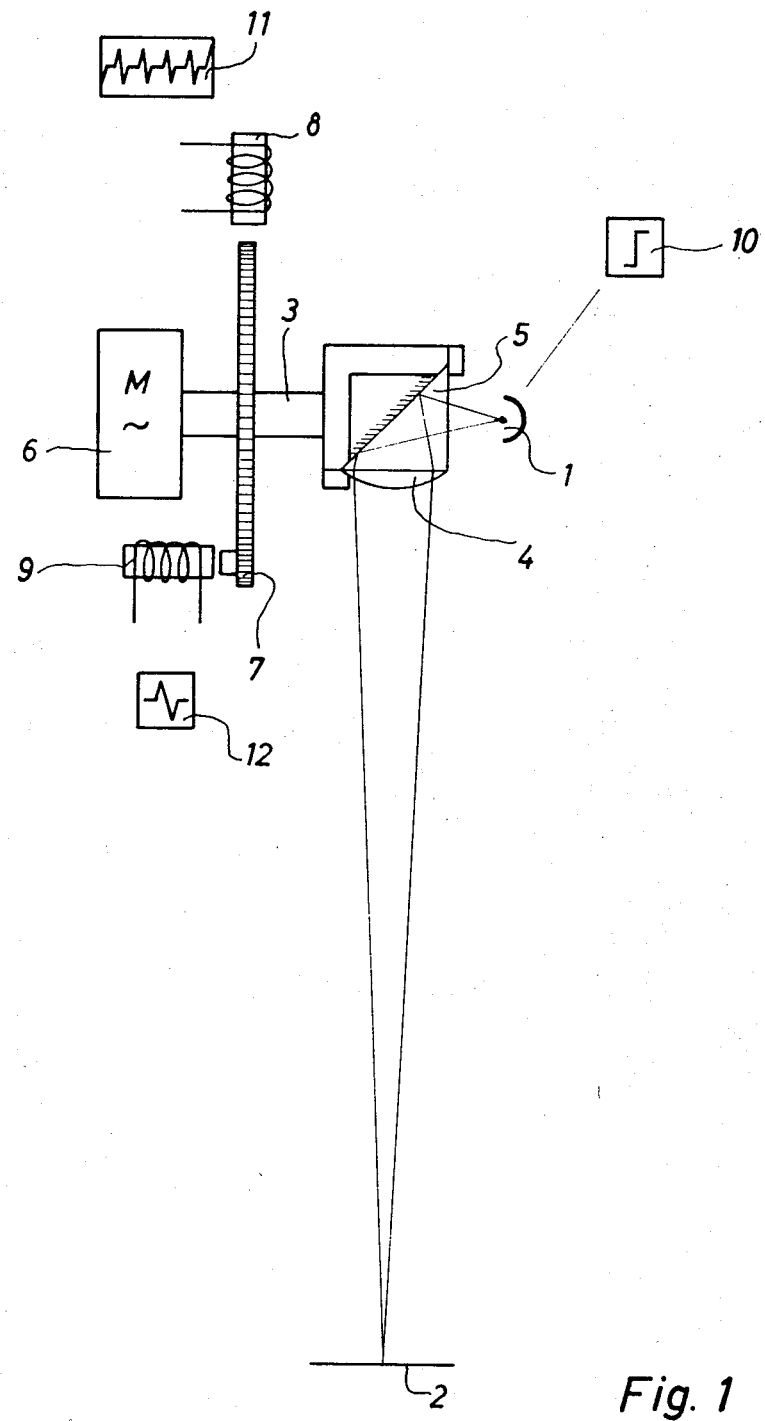

In the manufacture of products of great length and constant width, particularly in machining steel or other metals in rolling mills, it is necessary to monitor the width of the rolled object in order to adjust the rolling operation to maintain a constant width of the product. The problem is to measure the width of an object which varies its position in space within given limits.

From U.S. Letters Patent No. 2,548,590 there is known an arrangement in which two television cameras periodically scan two fields of vision in which the two edges of the object are located. By means of a control-circuit the television cameras displaceable in the direction of measurement are each above one edge. The distance between the cameras is a measure of the width of the object. In the event of lateral displacements the two cameras simultaneously follow this displacement. It is disadvantageous that the movement of the cameras requires a complicated structure and involves high inertia forces which have to be overcome during the adjustment. Therefore, this measuring system is not capable of following rapid position variations of the object.

There are other known arrangements wherein by means of rotatable scanning devices the responsive axes of two measuring instruments are periodically moved in opposite senses in a narrow field of vision along a path transverse of the edges of the object. When the edges are struck, pulses are produced, the relative positions in time thereof being utilized for the formation of the measured value. Such an arrangement is described, for example, in German patent application laid open to public inspection 1,056,842.

In some arrangements the pulses obtained by the passage across the edges of the object are reproduced on a picture screen and their positions are ascertained with respect to simultaneously reproduced time marks or a voltage corresponding to the positions of the pulses with respect to reference pulses is derived, reproduced or processed in a different manner. All known arrangements comprising rotatable scanning devices have in common that fluctuations of the angular velocity of the scanning members affect the measuring result. The fact that—as in known arrangements—a reference pulse is derived for each measuring period does not obviate this drawback. The sole result is that the errors involved up to the beginning of the measuring period in the angular positions of the scanning members with respect to the time marks are eliminated.

If in spite of these sources of errors the width of the object has to be determined with great accuracy, the measuring range covered by the scanning members has to be small. However, this is a disadvantage, since the adaptation of the measuring system to various desired widths of the object is thus drastically restricted.

In an arrangement known from German Patent Application ("Auslegeschrift") 1,183,701 the measuring value is obtained by causing the pulses obtained to ignite each a controllable rectifier, which is connected to a rectified alternating voltage, and by comparing the average value of the direct current obtained from the sum of the currents passing through said rectifier with a constant voltage. The voltage difference is neutralised by a phase shifting member, serving as a comparison member. The position thereof is rendered visible by an indicator on a scale. The measuring accuracy of this method is determined not only by the angular velocity fluctuations of the rotatable members, which give rise to phase shifts between the angular positions and the alternating voltage across the rectifiers, but also by the amplitude and the harmonics of the supply voltage, since the average value of the direct current obtained is in opposition to a constant comparison voltage and depends not only upon the relative phase positions of the measuring pulses but also upon the voltage variations, which gives rise to measuring errors particularly in the case of distorted, non-sinusoidal voltages.

All known arrangements having a larger scanning range require a linear relationship between the angular positions of the rotatable scanning members and the scanned paths. This involves an the one hand a considerable circuitry and on the other hand the possibilities of the choice of the reproducing system are unnecessarily restricted, particularly with respect to a large scanning range.

Apart from the lateral position in the scanning direction the distance of the measuring object from the scanning members is also changed. With all methods, with the exception of those using rotatable scanning members displaceable in the direction of measurement and adjustable to the edges or television cameras, this gives rise to inadmissible errors. However, the displacement of the scanning members requires a complicated mechanical or electronic arrangement, while the measuring accuracy depends upon wear of components.

In an arrangement for contact-free measurement of the width and/or the position of objects by means of pulses derived from rotatable scanning members, the above disadvantages are according to the invention avoided by coupling the scanning member with a pulse producing disc, divided such that in the time interval between each pair of pulses derived from the disc the same region of the object is scanned. By means of the pulses produced in the scanning member by the passage across the edge of the object and by means of a reference pulse produced in each scanning period, a selection is made among the pulses derived from pulse-producing disc such that the number of remaining pulses corresponds to the measuring value or to the departure thereof from the desired value.

It is thus possible to determine the position and/or the width of objects of different dimensions, whose positions in space vary within given limits, by pulse counting without the need for the scanning members themselves to vary their positions. It is thus also possible to determine the deviation of the measuring value from a given desired value by simply storing the desired value in a logical device.

The invention will be described with reference to the drawing, in which

Figure 2:
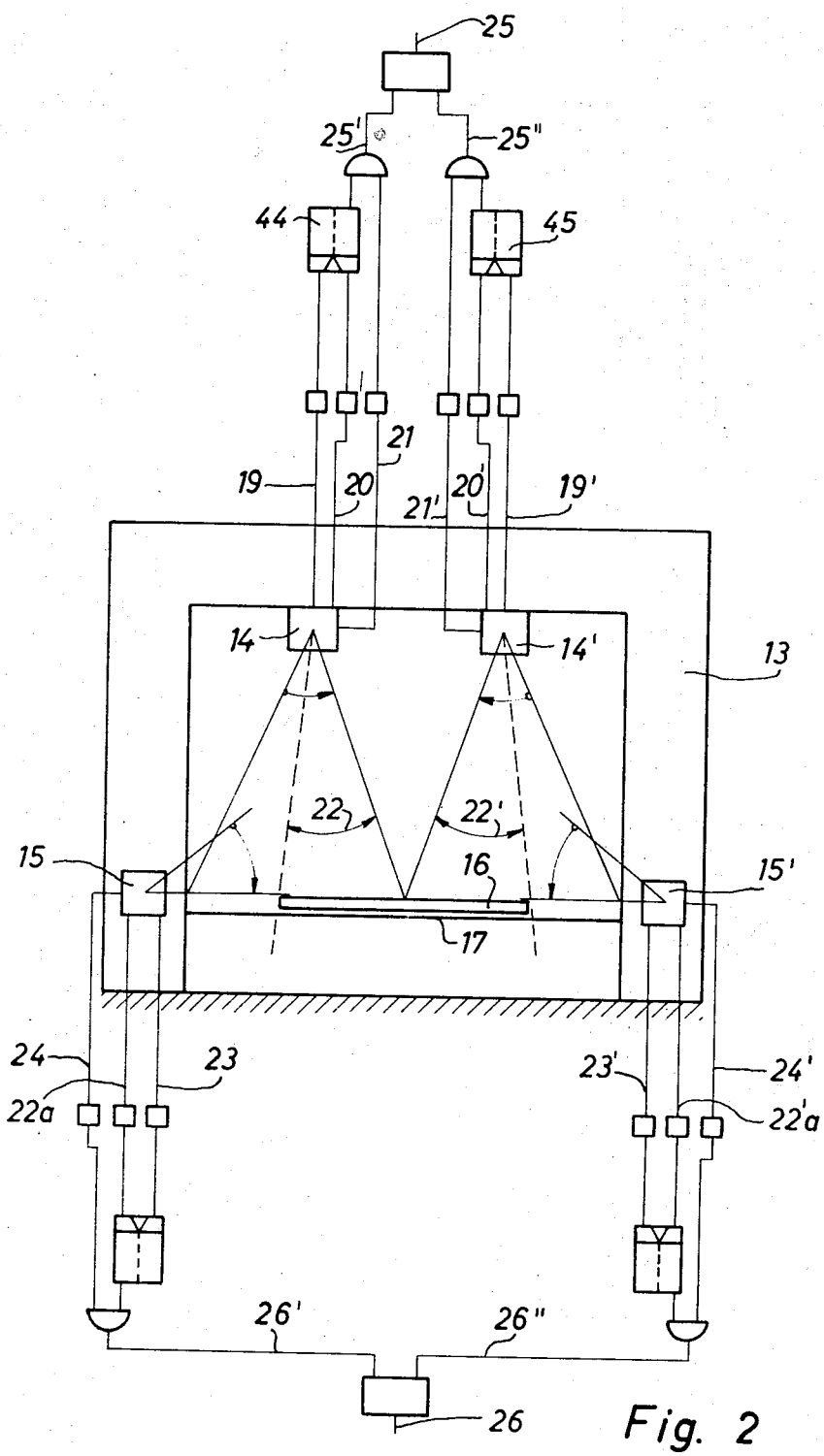
Figure 3:
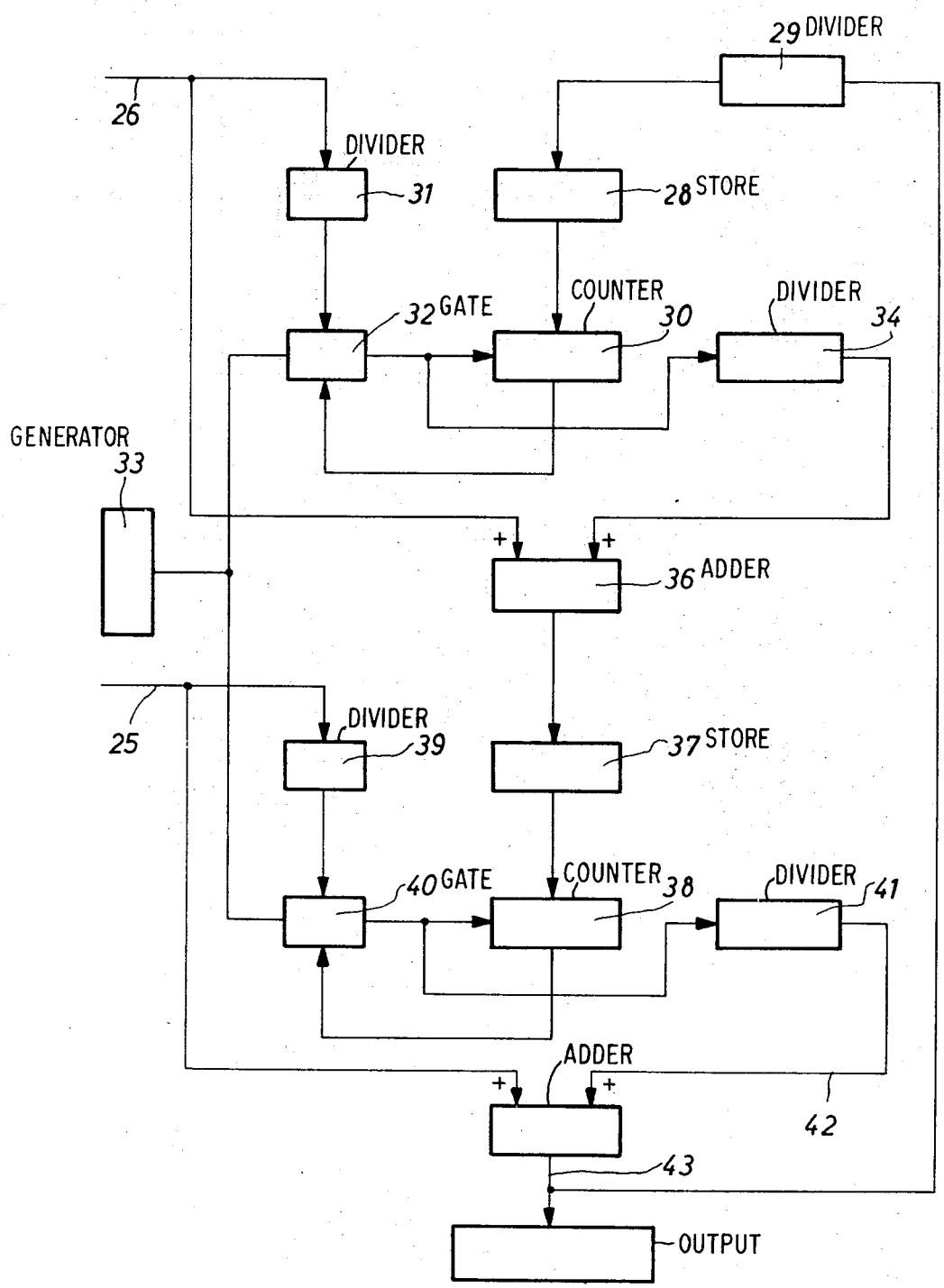
Figure 4A:
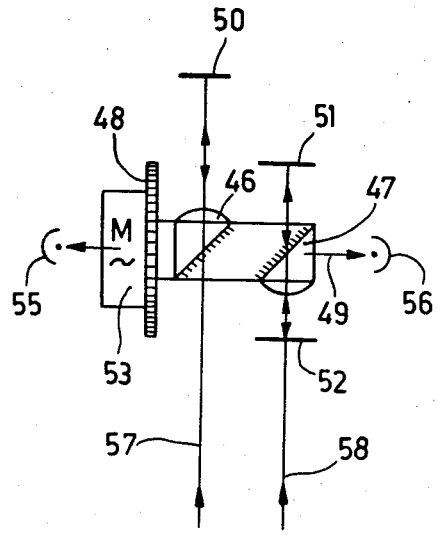
Figure 4B:
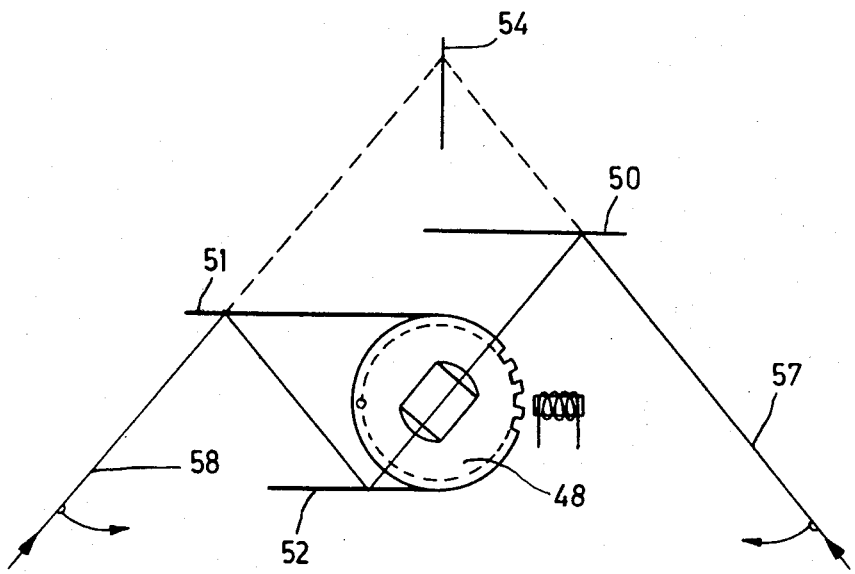

FIG. 1 shows diagrammatically a scanning member with non-linearly divided pulse-producing disc, FIG. 2 shows the arrangement of a plurality of scanning heads for measuring the width of a strip, FIG. 3 shows the block diagram for utilizing the pulses produced in the scanning members, FIGS. 4a and 4b show diagrammatically the combination of two scanning heads with a pulse-producing disc.

Onto the stationary photocell 1 (FIG. 1) is projected a point of the measuring path 2 via the combination of a lens 4 and a prism 5, adapted to rotate by the shaft 3. The prism and the lens are constantly rotated through the shaft 3 by the motor 6. A voltage jump 10 is produced at the photocell when the light intensity varies on the scanned path (for example at the edges of a redhot rolled object). The angular position of the prism at which this voltage jump occurs is determined with the aid of the toothed disc 7 and the inductive pick-ups 8 and 9. The pitch of the toothed disc is not constant, but it is chosen so that a linear relationship is obtained between the number of the pulses 11 produced in the pick-up 8 and the length scanned along the path. During each revolution a pulse 12 is produced in the pick-up 9, which pulse fixes a reference point of the scanned path.

FIG. 2 shows the scanning members 14, 14' and 15, 15', secured to the frame of the roller 13. The pick-ups 14, 14' scan the width of the object 16, which leaves the rollers on the runner 17. The pick-ups 15, 15' scan the height of the edges of the object in excess of a reference height. The measuring results serve for correcting the measuring results from 14, 14'. It is thus possible to cover large scanning ranges with fixed scanning members without adversely affecting the measuring accuracy.

As is shown in FIG. 2, the pick-ups 14, 14' produce pulses in the conductors 19, 19' which fix the end of the scanning path (reference point), and furthermore pulses in the conductors 20, 20', at the passage across the edges of the object and pulse sequences in the conductors 21, 21' are produced by the pulse-producing discs for counting the length of the path. The width of the measured object is equal to the sum of the pulses produced by the discs during the passage through the angles 22, 22'.

The pick-ups 15, 15' count in a similar manner pulses delivered by the pulse-producing discs between the pulses occurring in the conductors 22a, 22'a, derived from the passage across the edges and the pulses in the conductors 23, 23', defining the reference height, in the conductors 24, 24'.

FIG. 2 illustrates furthermore the processing of the initial pulses. After the corresponding amplifying and synchronizing stages the pulses emanating from the pulse-producing discs in the conductors 21, 21' and 24, 24' are added to the pulse sequences 25, 26 respectively in order to save one half of the electronic arrangement. The sum of the pulses of the sequence 25 per measuring period provides the width of the object independently of the lateral position, if the height does not exhibit any deviation from the desired position.

However, if the scanned path is nearer the pick-ups 14, 14', an excessive number of pulses will be counted; if it is at a greater distance, the number counted will be too low. In order to determine the resultant error the deviation of the height of the object from the desired position has to be known. It is assumed hereinafter that the desired position is such that only larger distances from the pick-ups occur; in this case the measuring values are always too low, while only positive corrections are required. The geometric position of the pick-ups 14, 14' with respect to the object 16 determines a minimum deviation of the height giving rise to a measuring error of one unit of length at the maximum width of the object. The deviation of the height, which is most effectively measured in said minimum units, may be retained in the store 37 (FIG. 3), which must have an adequate capacity for the maximum deviation of the height. The store 37 serves for presetting the counter 38, which receives pulses from the pulse generator 33 via the gate 40. The gate 40 is opened by each pulse of the sequence 25, which indicates the non-corrected width of the object and is kept open until the number preselected in the counter 38 is reached, so that for each pulse of the sequence 25 the number of pulses corresponding to the deviation of the height arrives at the dividing member 41. This dividing member divides the pulse sequence in a ratio of 1:$z$ ($z$=the capacity of the store 37 and of the counter 38 corresponding to the maximum deviation of the height). Since the ratio between the deviation of the height and the basic desired distance between the pick-ups 14, 14' and the object is just the same as the ratio between the error of the width measurement and the non-corrected width measurement, the number of pulses corresponding to said error is found in the conductor 42 after the dividing member 41. Said number is added to the pulse sequence 25. The sum in the conductor 43 is the definite measuring result. The fact this result is available for processing, indication and so on can be stated after each measuring period by the position of the bistable triggers 44, 45 (FIG. 2). Since for each pulse of the pulse sequence in the conductor 25 the number of pulses corresponding to the deviation of the height has to reach the counter 38 and the dividing member 41, the pulse generator 33 must have a high follow-up frequency. On the other hand, the geometric situation of the measuring arrangement (FIG. 2) determines a minimum length of the measured path which has to be exceeded for the error of the width measurement to exceed one unit of length. The dividing member 39 can therefore divide accordingly the pulse sequence of the conductor 25, so that the required maximum frequency can be reduced. The dividing member 41 then has a dividing ratio which is so much smaller that the dividing members 39 and 41 together divide by a ratio of 1:$z$.

The deviation of the height retained in the store 37 is measured by means of the pick-ups 15, 15'. Like the result of the width measurement depends upon the deviation of the height, the height measurement depends upon the width and the position of the object. Therefore, the pulse sequence of the conductor 43 is written in the store 28, which serves for presetting the counter 30. The capacity of these members is chosen so that it corresponds to the maximum distance of the edges of the object from the pick-ups 15, 15' exceeding the desired distance. The store 28 is always filled, at the beginning of each measuring period and is reduced by the pulse sequence of the conductor 43, since a great width of the object corresponds to a small distance and a small width corresponds to a large distance. Since the geometric situation of the pick-ups determines the definition of the distance measurement required for measuring the deviation of the height, a more economic arrangement is obtained by dividing the pulse sequence of the conductor 43 by the dividing member 29. The pulse sequence of the conductor 26, which indicates the deviation of the height without being corrected, is applied, as the case may be, via the dividing member 31, which together with the dividing member 34, divides by a ratio of 1:$y$, through the adding stage 36, to the store 37 and serves for controlling the gate 32. The members 28, 30, 31, 32, 34 have functions similar to those of the members 37, 38, 39, 40, 41, so that after the dividing member 34 a pulse sequence appears which corrects the measurement of the height in accordance with the width of the object. This sequence is furthermore applied via the stage 36 to the store 37.

By a corresponding adjustment of the pick-ups 14, 14' and 15, 15' it is ensured that the instants at which the pulse sequences appear at the conductor 26 alternate with the instants at which the pulse sequences appear at the conductor 25, so that the last measurement of the width is always available as a basis for the measurement of the deviation of the height and this measurement is available as a basis for the measurement of the width and so on.

Since the pulse sequences of the conductors 25 and 26 are formed by the sums and the average values respectively of the pulse sequences of the conductors 25', 25" and 26', 26", measuring errors will occur when the object deviates from the symmetrical position between the pick-ups 15, 15' and when, simultaneously, the object is in an oblique position. If these errors are not acceptable, it is necessary to use the partial sums of the conductors 25', 25″ and 26′, 26″ and to use therefore double the circuitry, instead of using the pulse sums of the conductors 25 and 26.

Apart from the method described above, the pulse sequences may be utilized in a different manner according to circumstances. For example, a data processing system may be employed in production control or part of the electronic arrangement may be economized, if the deviation of the height does not exceed a permissible value.

An important simplification is formed by the combination of pick-ups 14, 14′ in an arrangement as shown in FIG. 4. The combinations of deflecting prisms 46 and lenses 47 rotate together with the dividing disc 48 about the shaft 49. The path of the rays of the prism 46 includes a mirror 50 and that of the prism 47 includes two mirrors 51, 52. By the appropriate choice of the positions of these mirrors and of the focal distances of the lenses it is ensured that upon rotation of the dividing disc by means of the motor 53 points of the measured path lying symmetrically to the lens 54 are projected onto the photocells 55, 56 as is indicated by the main rays 57, 58. The projection onto the photocell 55 is performed via a hollow shaft.

As a matter of course, other reproducing systems with formed mirrors, rotating mirrors and stationary collecting lenses are possible. In contrast to the diagrammatically shown embodiments, the measured path is scanned several times in one revolution of the dividing discs, which may be achieved in known manner by providing a plurality of prisms or corresponding elements.

Instead of the inductive scanning, a light-sensitive capacitative or other scanning may be used for producing the pulses at the dividing discs.

What is claimed is:

1. A device for contact free measurement of the width of an object comprising a first scanner periodically scanning one edge of said object, a second scanner periodically scanning the other edge of said object, said first and second scanners positioned above the object so as to together scan the entire width of said object, said first and second scanners each respectively producing a first and second series of pulses, gating means coupled to each of said scanners for combining said first and second series of pulses, a third scanner for scanning the height of said object and producing a third series of pulses responsive to said height, storage means having stored therein a preselected height deviation, comparison means for comparing the height represented by said third sequence of pulses with the contents of said storage means, and means responsive to said comparison for adjusting the combination of said first and second pulse sequencers to provide a height corrected width measurement.

2. A device for contact-free measurement of the width and/or the position of objects comprising a pulse producing rotatable scanning member, a pulse-producing disc coupled to said scanning member and producing a series of pulses such that in the time interval between each pair of pulses derived from said disc a corresponding region of the object is scanned, said scanning member producing pulses during each passage across the edges of said object, means generating a reference pulse during each scanning period, and means responsive to said scanning pulses and said reference pulse for making a selection among the pulses derived from said pulse producing disc such that the number of remaining pulses corresponds to the measured value, a further scanning member including a pulse generating means for determining the height of said measured edges above a predetermined reference height, said further pulse generating means including a pulse producing disc, and means for pairwise adding the pulses supplied by each of said pulse discs to each other to form an average for selection.

3. A device as claimed in claim 2 wherein a common tooth-disc is connected to the scanning members for the measurement of the width.

4. A device as claimed in claim 3, wherein for correcting the measuring result a frequency generator and at least one preselection counter responsive to said scanning pulses are provided in conjunction with a frequency divider.

References Cited

UNITED STATES PATENTS

| | | | |
|---|---|---|---|
| 2,791,931 | 5/1957 | Summerhayes | 250—219 |
| 2,868,059 | 1/1959 | Summerhayes | 250—219 |
| 3,033,991 | 5/1962 | Sampson | 250—219 |
| 3,094,623 | 6/1963 | Weiss | 250—219 |
| 3,234,844 | 2/1966 | Fain et al | 250—235 X |
| 3,254,226 | 5/1966 | Bobula et al. | 250—219 |
| 3,312,829 | 4/1967 | Sprengers et al. | 250—236 X |
| 3,327,125 | 6/1967 | Herchenroeder | 250—219 |

FOREIGN PATENTS

| | | |
|---|---|---|
| 147,988 | 12/1962 | U.S.S.R. |
| 251,090 | 4/1964 | Australia |

ARCHIE R. BORCHELT, Primary Examiner

M. ABRAMSON, Assistant Examiner